(12) United States Patent
Olivier

(10) Patent No.: US 6,397,773 B2
(45) Date of Patent: Jun. 4, 2002

(54) CONNECTION SYSTEM FOR CONNECTING EQUIPMENT TO UNDERWATER CABLES

(75) Inventor: Andre' W. Olivier, River Ridge, LA (US)

(73) Assignee: Input/Output, Inc., Stafford, TX (US)

( * ) Notice: Subject to any disclaimer, the term of this patent is extended or adjusted under 35 U.S.C. 154(b) by 0 days.

(21) Appl. No.: 09/911,161

(22) Filed: Jul. 23, 2001

Related U.S. Application Data

(63) Continuation of application No. 09/344,884, filed on Jun. 25, 1999, now Pat. No. 6,263,823.

(51) Int. Cl.[7] ............................................... B63G 8/14
(52) U.S. Cl. ...................................................... 114/245
(58) Field of Search ................................ 114/243–246; 367/17, 19, 20, 154

(56) References Cited

U.S. PATENT DOCUMENTS

| | | |
|---|---|---|
| 3,931,608 A | 1/1976 | Cole |
| 4,290,124 A | 9/1981 | Cole |
| 4,549,035 A | 10/1985 | Zaltsberg |
| 4,711,194 A | 12/1987 | Fowler |
| 4,879,719 A | 11/1989 | Dumestre |
| 5,214,612 A | 5/1993 | Olivier et al. |
| 5,278,804 A | 1/1994 | Halvorsen |
| 5,384,751 A | 1/1995 | Blier et al. |
| 5,529,011 A | 6/1996 | Williams |
| 5,619,474 A | 4/1997 | Kuche |
| 5,709,497 A | 1/1998 | Zoch et al. |
| 6,034,923 A | 3/2000 | Wooters |
| 6,043,433 A | 3/2000 | Schweitzer |

FOREIGN PATENT DOCUMENTS

| | | |
|---|---|---|
| GB | 2191230 A | 12/1987 |
| WO | WO97/11395 | 3/1997 |
| WO | WO98/28636 | 7/1998 |

OTHER PUBLICATIONS

International Search Report of PCT/US00/40248 mailed by ISA/EP on Nov. 6, 2000.

*Primary Examiner*—Jesus D. Sotelo
(74) *Attorney, Agent, or Firm*—James T. Cronvich

(57) ABSTRACT

A connection system for connecting external devices to specified locations on a marine seismic streamer. Inner collars are clamped to the cable at specified locations along its length. Each inner collar forms a circular race encircling the cable. A cuff attached to an external device is in the form of a C-shaped cylindrical ring with a circular inner surface. A gap in the ring interrupts the inner surface. A throat is formed in the ring by the gap, which extends the full length of the cuff across the ends of the C. The spacing between the ends of the C across the throat defines the width of the gap. The width of the gap is slightly larger than the diameter of the cable so that the cuff can be slipped over the cable through the throat. The width of the gap is smaller than the diameter of the circular race so that, when the cuff is slid into position on the race, the cuff cannot be removed radially from the race. The inner surface of the cuff rides on the race to allow the cable to rotate inside the cuff. The race can include a circumferential groove for retaining a retractable pin extending from the external device to snap the device in place and a raised circumferential shoulder to further restrain the cuff and attached device from sliding along the cable.

6 Claims, 5 Drawing Sheets

CONNECTION SYSTEM FOR CONNECTING EQUIPMENT TO UNDERWATER CABLES

This application is a continuation of Ser. No. 09/344,884 filed Jun. 25, 1999, U.S. Pat. No. 6,263,823.

TECHNICAL FIELD

This invention relates to marine seismic prospecting and, more particularly, to a connection system for attaching equipment to and detaching equipment from marine seismic cables.

DESCRIPTION OF RELATED ART

A marine seismic streamer is a cable, typically several thousand meters long, that contains arrays of hydrophones and associated electronic equipment along its length. One purpose of the streamer is to position the hydrophone array at a known depth and orientation relative to a towing vessel in a survey area. Externally mounted equipment, such as depth controllers, called "birds," emergency recovery pods, and acoustic pods, performs the functions of positioning and controlling the cable. Individual units of these kinds of external equipment are attached to the streamer at various positions along its length. All of these external units should be both attached to and removed from the cable as quickly and reliably as possible. Operational expenses of seismic vessels require rapid attachment and detachment of these external units. Because these external units typically cost thousands of dollars, they demand the highest degree of reliability from any attachment scheme. Cable attachment failures caused by connector failures or by cable accidents result in a significant financial loss both in time and in expensive equipment.

Today's typical cable attachment solutions consist of a collar arrangement that relies on a hinge and latch mechanism for operation. Examples of these mechanisms are described in U.S. Pat. No. 5,507,243, "Connector For Underwater Cables," Apr. 16, 1996, to Oneil J. Williams et al. and in U.S. Pat. No. 5,709,497, "Latching Device," Jan. 20, 1998, to David W. Zoch et al. External units attached to the collars are clamped around races on the cable as the cable is payed out from the back deck of a survey vessel. The races allow the cable to rotate inside the collars while the external units do not rotate as they are towed along. Conventional connector schemes usually require one operator to position and hold the awkward external unit in place while a second operator secures the manual latching collars to the cable, often while trying to maintain balance on a rolling survey vessel. Requiring two operators significantly increases the cost of operation.

These conventional mechanisms also incorporate springs or pins having dissimilar metals in contact with the collar. Dissimilar metals in contact in seawater corrode because of galvanic reactions. While conventional hinge-and-latch collars offer quick attachment and removal when new, exposure to salt water degrades their performance and can eventually lead to their complete failure. A failed collar can result in the loss of an external electronic unit or a jammed connector on the seismic cable, which costs time in removing external devices as the cable is reeled in.

A thick cross section (typically of aluminum) is required to safely imbed a conventional latching mechanism within the collar. Such a large cross section creates hydrodynamic noise and lateral accelerations on the seismic cable as it is towed through the water. These undesirable characteristics corrupt the sensitive measurement of seismic acoustic signals by the hydrophones.

Clearly there is a need for an apparatus and a method for avoiding these serious shortcomings that significantly add to the cost of a seismic survey at sea.

SUMMARY OF THE INVENTION

This need is satisfied and other shortcomings are overcome by an innovative cable connection system having features of the invention. The connection system includes a cuff attached to a piece of equipment to be connected to the streamer cable at a known location. The C-shaped cylindrical cuff has a circular inner surface interrupted by a gap. A throat is formed by the gap in the cuff extending the length of the cuff. The spacing between the ends of the C across the throat defines the width of the gap. The width of the gap is slightly larger than the diameter of the streamer cable so that the cuff can slip onto the cable. An inner collar having a race is affixed to the cable at a known location. The diameter of the race is greater than the width of the gap formed by the cuff's throat. The inner surface of the cuff can be slid into position on the race of the inner collar. Because the diameter of the race exceeds the width of the gap of the throat, the cuff and the attached equipment cannot disconnect radially from the inner collar. Structural elements on the collar further prevent longitudinal displacement of the cuff along the inner collar. In this way, equipment is connected to the cable at a known location.

In a preferred version of the system, the inner collar has a circumferential groove that admits a retractable pin extending from the external unit through an aperture in the cuff. The groove constrains the pin and prevents longitudinal movement of the external unit along the cable and off the inner collar. A single operator can remove the unit with the cuff from the inner collar by manually retracting the pin and sliding the cuff longitudinally off the inner collar and then radially off the cable. In an alternative version, the inner collar has a raised circumferential shoulder just aft of the race to act as a precise longitudinal stop for the cuff. Forward motion of the cable through the water will hold the cuff against the shoulder. Preferably, the cuff itself is of unitary construction with no moving parts.

Thus, the novel connection system includes a cuff having no moving parts and no dissimilar metals in contact to provide a connector that is significantly more reliable, even after long exposure to seawater. The connection system does not require two operators as do conventional systems. One operator suffices because the connection system requires no activation of a latch for a secure attachment.

BRIEF DESCRIPTION OF THE DRAWINGS

These and other features, aspects, and advantages of the invention are better understood by referring to the following description, appended claims, and accompanying drawings in which:

DETAILED DESCRIPTION

Figure 1:
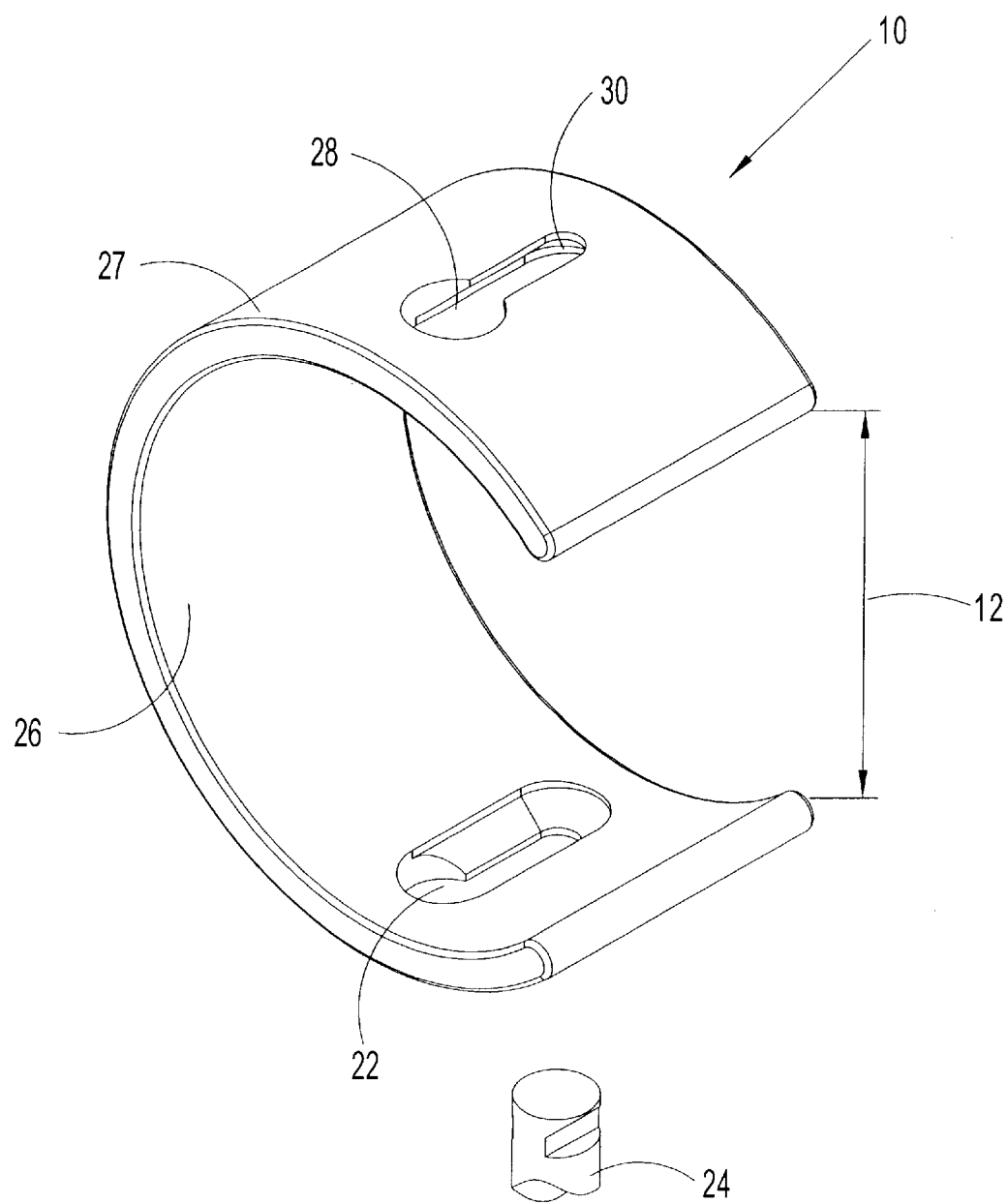
FIG. 1 is a perspective view of one version of a connector for use in a system for connecting devices to an underwater cable embodying features of the invention.
Figure 2:
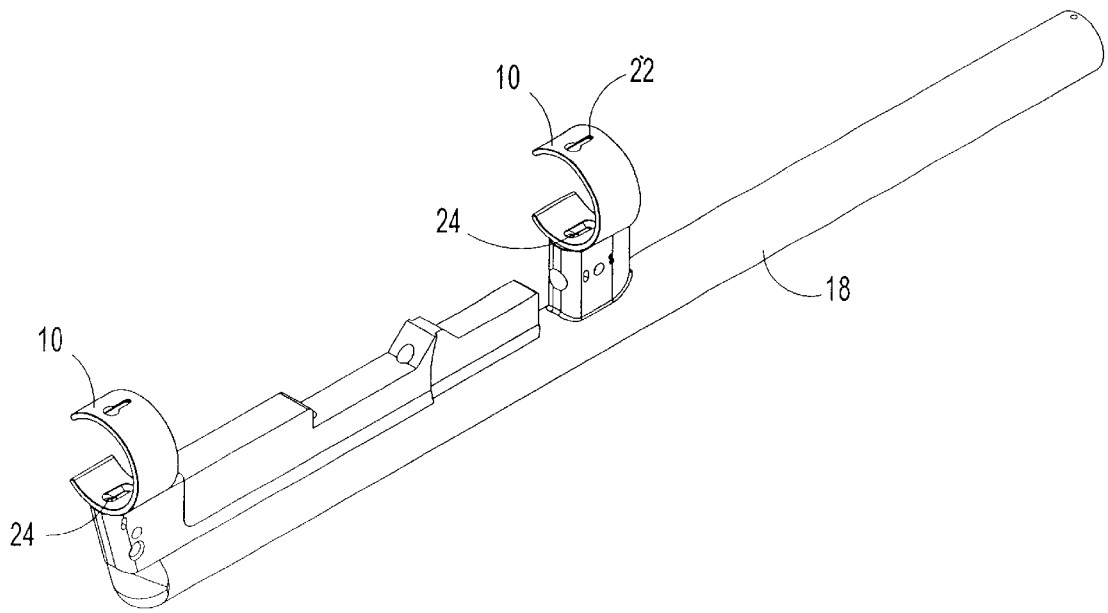
FIG. 2 is a perspective view of two connectors as in FIG. 1 shown attached to an external unit, in this example, a cable-leveling bird.

One example of a system embodying features of the invention for connecting external units to an underwater cable is shown in FIGS. 1–4. A key component of the system, which achieves a reliable, mechanism-free, connection to the seismic cable, is a C-shaped cylindrical ring, or cuff 10, serving as an outer collar. The cuff has an opening, or throat 12, formed by a gap in the cuff along the length of the cuff between the ends of the C. The width of the gap between the ends of the C across the throat is slightly larger than the diameter 14 of an underwater seismic cable 16. The cuff is preferably of unitary construction, i.e., no dissimilar metals or moving parts, fabricated from a material that will survive long term exposure to seawater and can withstand extensive mechanical loads. Because the cuff freely rotates about the cable similar to the outer race of a journal bearing, friction, especially along its inner surface 26, must be minimized. Materials such as aluminum, titanium, and engineering grade plastics are preferred for the cuff. Each external unit 18, such as a cable-leveling bird as depicted in FIGS. 2 and 4, an acoustic transmitter, receiver, or transceiver, a cable recovery device, or a float tube, to be connected to the cable typically has two attach points requiring two cuffs. (Of course, external units with a single cuff are also possible.) The cuffs are attached to the external units, for example, by attachment means using conventional external device hardware 20 as shown in the cutaway portion of FIG. 4D and described, for example, in U.S. Pat. No. 5,214,612, "Swing Plate Latch Mechanism," May 25, 1993, to André W. Olivier et al., the disclosure of which is hereby incorporated by reference. In the version shown, two keyways 22 machined 180° apart around the circumference of the cuff accept a dovetail pin 24 extending from the external unit through an outer surface 27 of the cuff. The keyway has a circular opening 28 at one end to accept the head of the dovetail pin and a narrower slotted portion 30 extending from the circular opening to the other end of the keyway. The dovetail pin acts as a self-centering guide and swivel. Two keyways are provided to enable the mounting of two external units, such as a bird and a float tube, per connection location on a seismic cable. The throat is preferably positioned about midway between the two keyways so that the throat assumes an orientation on the cable not facing upward. The important point is that the throat should not be positioned on the cuff diametrically opposite an attached external unit. In other words, the throat should be spaced circumferentially around the cuff less than 180° from the attached external unit.

Figure 3:
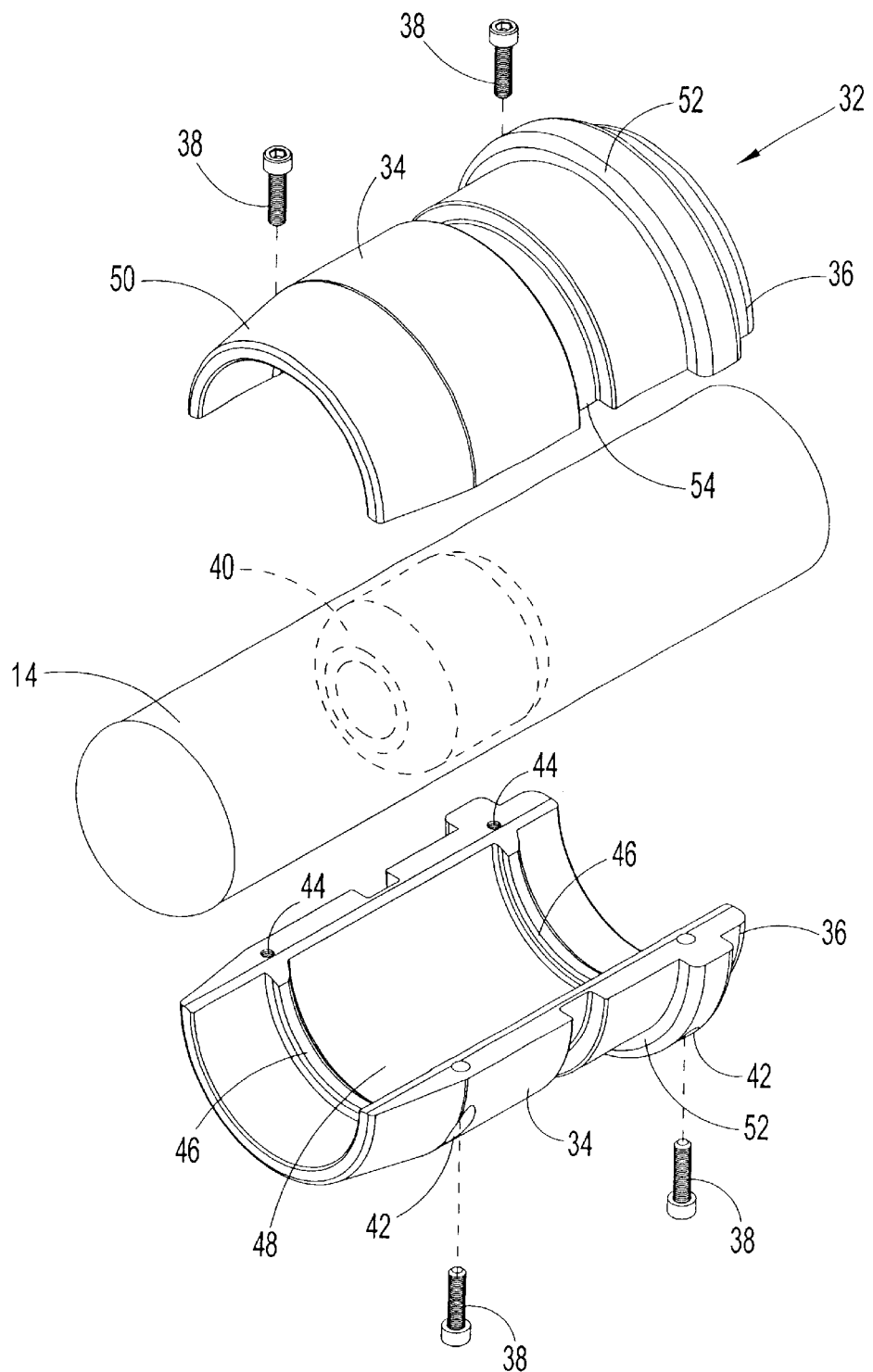
FIG. 3 is an exploded perspective view of an inner collar showing its attachment to a section of an underwater cable.

As shown in FIG. 3, an inner collar 32 is semipermanently clamped around the cable 14 and establishes a longitudinal mounting position along the cable's length and forms the inner bearing race 34 for the cuff. The inner collar consists of two symmetrical halves 36, which are screwed together around the cable with screws or bolts 38 typically on top or in front of a cable spacer 40 located within the cable. Screw holes 42 on one side of the collar halves admit the screw heads, which thread into threaded holes 44 on the other side of the collar halves. Structural elements, such as a pair of raised circumferential ribs 46, are included along the interior surface 48, which can be sized differently to match different seismic cables. The elements prevent longitudinal movement of the collar along the cable and, therefore, of an attached external unit. As shown in FIG. 3, the ribs are spaced to just span the fixed cable spacer, which holds the clamped inner race in place. A beveled surface 50 at the fore end of the inner collar facilitates self-centering of the cuff. A shoulder 52 at the aft end prevents longitudinal translation of the external unit once installed. A circumferencial groove 54 accepts a conventional retractable pin 56 extending from the external unit. The spring-biased, self-activating pin allows the external unit with attached cuff to snap in place in the race and further prevents forward translation of the external unit along the cable. The inner collar 32 is preferably fabricated from a plastic that can withstand harsh mechanical and seawater exposure. For low friction and wear, an engineering grade plastic, such as acetal, nylon, and polyethylene, is preferred.

Figure 4A:
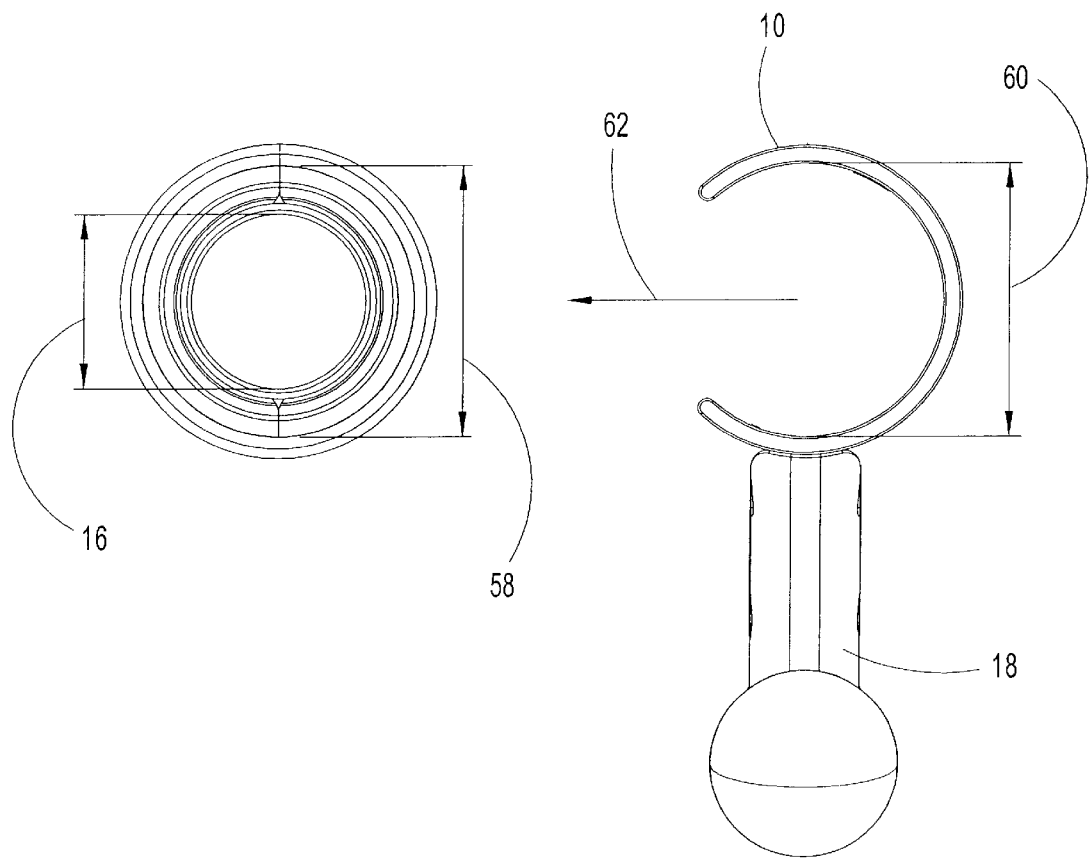
FIGS. 4A–4D are front (FIG. 4A) and side elevation (FIGS. 4B–4D) views of a section of an underwater cable showing a system according to the invention and an associated procedure for attaching an external unit to the cable at a known location.

As shown in FIG. 4A, the outer diameter 58 of the inner race 32 is slightly larger than the diameter 16 of the seismic cable. The inside diameter 60 of the cuff is slightly larger in diameter than the inner race. The width of the gap at the throat 12 of the cuff is slightly larger than the cable diameter, but less than the diameter of the inner race. These diametrical differences create an interlocking condition and a highly reliable fault tolerant connection.

Figure 4B:
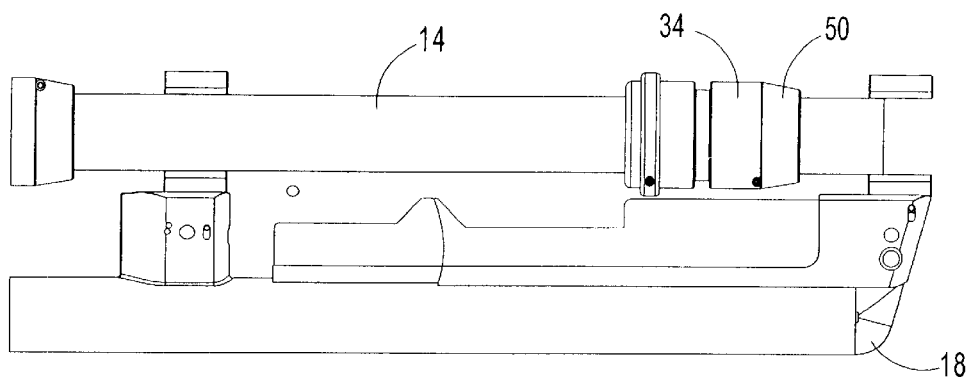
Figure 4C:
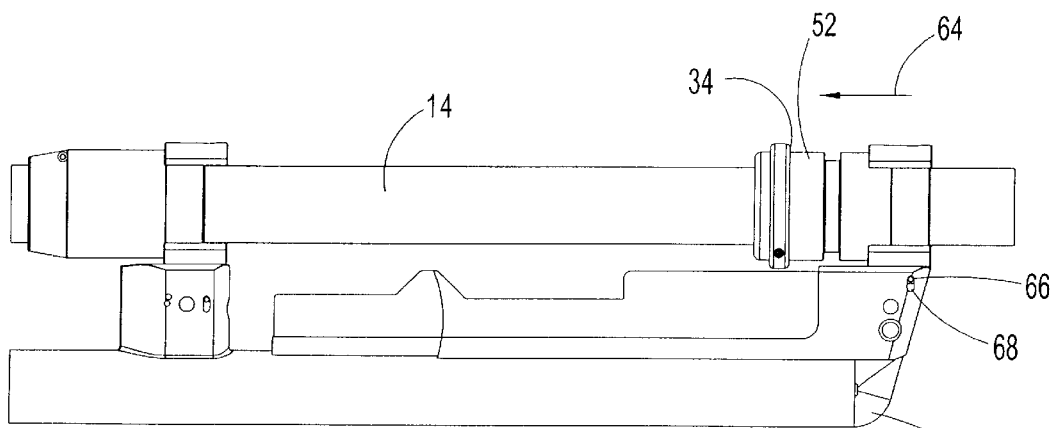
Figure 4D:
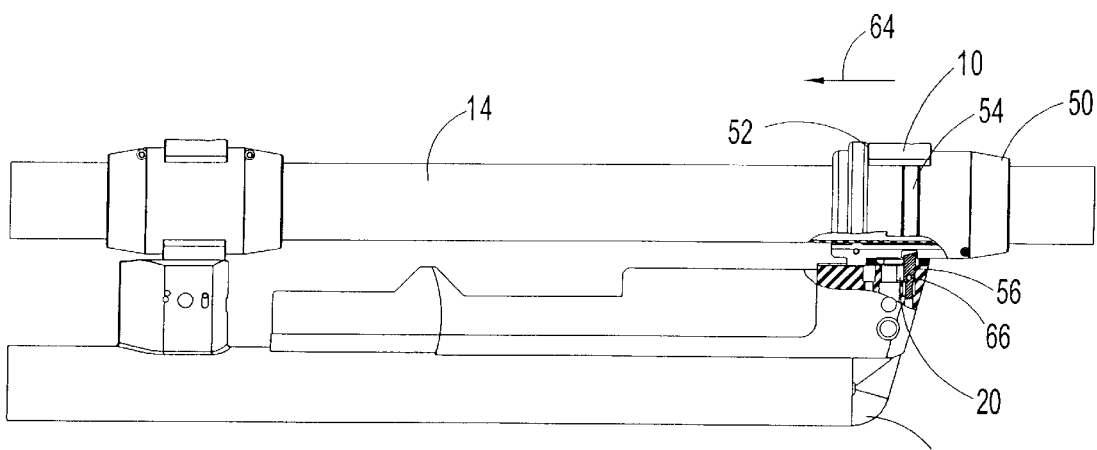

A method for attaching an external unit to a streamer cable is shown in FIGS. 4A–4D. First, an external device 18, retained to the cuff 10 by the dovetail pin 24, is installed by positioning each external cuff in front of and to the side of the inner races (FIGS. 4A and 4B). Then a radial motion perpendicular to the cable, as indicated by arrow 62, is required to slip the cuff and its throat over the cable to suspend the external unit from the cable. In this configuration, the cable temporarily supports the unit, unlike existing methods where an operator supports the device. A secondary longitudinal motion, indicated by arrow 64, along the length of the cable (FIG. 4C) locates the unit onto the inner collar 32 with the inner surface 26 of the cuff 10 riding in the inner race 34 so that the cable can rotate inside the cuff. The bearing shoulder 52 supports thrust loads and positive location. The spring-loaded pin 56 located in the external device automatically extends into the groove 54 in the inner race 34 and prevents forward motion of the external unit. The device is ready for deployment as shown in FIG. 4D. To detach the external unit from the cable, the retractable pin is first lowered out of the groove by downward pressure on a stub 66 extending out perpendicularly from the pin through a vertical slot 68 in the external device. The remainder of the detachment process is just the reverse order of the attachment procedure.

Clearly, the invention, as illustrated by the preferred example version described in detail, provides, among other advantages: a marine cable connection having no moving parts, which is more reliable than prior art connections; a marine cable connection that performs the same whether brand new or aged as a result of long term exposure to seawater; a marine cable connection that requires fewer operators to safely operate; a marine cable connection with a lower hydrodynamic noise profile because of the lack of a salient attachment mechanism; a marine cable connection that can readily be adapted to both existing seismic cables as well as new technology cables; a marine cable connection that is lighter and simpler than existing connectors; a marine cable connection that consists of an inner race and an outer collar engaged by means of geometrical features rather than a mechanism; and a marine cable connection that is significantly quicker to operate than prior art connectors.

Although the invention has been described in detail with reference to a preferred version, other versions are possible. For example, external devices requiring only a single attachment point using a single cuff and inner race are possible with the invention. In a two-cuff attachment, the rear inner race could have, but need not have, a circumferential groove and a cooperating retractable pin or a shoulder acting as a longitudinal stop. The gap forming the throat could be of constant width, as shown in the drawings, or could alternatively be narrower at one end than at the other. The cuff could have only a single keyway if attachment of two external units at a common location is not required. Instead of attaching to an external unit by means of a dovetail pin retained in a keyway, other attachment means are possible. For example, the cuff could be semi-permanently fastened to the external unit by screws or other fasteners or permanently attached by adhesives or formed as an integral part of the external unit. The method of attachment can be manually performed as described or performed by an automated device handling system. The invention also has application on untowed sea-bottom-deployed cables to which similar external units are attached. Therefore, the spirit and scope of the claims are not limited to the description of the preferred version.

I claim:

1. A connection system for connecting an external device to a location on an underwater cable, the connection system comprising:

a first collar affixable around an underwater cable at a specified location;

a second collar affixable around the underwater cable at a spaced apart location;

a first C-shaped cuff rotatably attachable around the first collar, the first C-shaped cuff including attachment means for attaching to an external device;

a second C-shaped cuff rotatably attachable around the second collar, the second C-shaped cuff including attachment means for attaching to the external device;

the first and second C-shaped cuff each including a longitudinal gap between the ends of the C, wherein the gap is sized to admit the underwater cable radially into the cuffs and to prevent radial removal of the cuffs from the first and second collars.

2. A connection system as in claim 1 wherein the first collar further comprises a race for rotatably receiving the first C-shaped cuff.

3. A connection system as in claim 2 wherein the first collar further comprises a circumferential groove and the first C-shaped cuff further forms an aperture therethrough to admit a pin extendable into the circumferential groove.

4. A cuff for connecting an external device to a seismic cable having a cylindrical collar, the cuff comprising:

a C-shaped cylinder rotatably attachable around a cylindrical collar affixed to a seismic streamer;

a throat formed in the C-shaped cylinder by a longitudinal gap extending the full length of the C-shaped cylinder between the ends of the C, wherein the gap is sized to admit the seismic cable radially into the C-shaped cylinder and to prevent radial removal of the C-shaped cylinder from the cylindrical collar.

5. A cuff as in claim 4 wherein the cuff further defines an aperture therethrough to admit a pin through the C-shaped cylinder.

6. A connection system for connecting an external device to an underwater cable, the connection system comprising:

a collar attachable around an underwater cable, the collar including a shoulder defining an end of a circumferential bearing race; and a C-shaped cuff having an inner cylindrical surface for riding in the bearing race of the collar;

wherein the collar further includes a circumferential groove in the bearing race; and wherein the C-shaped cuff includes an aperture therethrough to admit a pin into the circumferential groove.

* * * * *